(12) United States Patent
Asada et al.

(10) Patent No.: US 11,937,104 B2
(45) Date of Patent: Mar. 19, 2024

(54) RADIO WAVE ENVIRONMENT ANALYSIS DEVICE AND RADIO WAVE ENVIRONMENT ANALYSIS METHOD

(71) Applicant: Panasonic Corporation, Osaka (JP)

(72) Inventors: Takuya Asada, Osaka (JP); Teppei Emura, Osaka (JP); Yasunori Shimazaki, Osaka (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 273 days.

(21) Appl. No.: 17/478,491

(22) Filed: Sep. 17, 2021

(65) Prior Publication Data
US 2022/0007216 A1     Jan. 6, 2022

Related U.S. Application Data

(63) Continuation of application No. PCT/JP2020/005502, filed on Feb. 13, 2020.

(30) Foreign Application Priority Data

Mar. 28, 2019   (JP) ................................. 2019-063600

(51) Int. Cl.
*H04W 24/06*   (2009.01)
*H04B 17/318*  (2015.01)
*H04W 4/029*   (2018.01)

(52) U.S. Cl.
CPC .......... *H04W 24/06* (2013.01); *H04B 17/318* (2015.01); *H04W 4/029* (2018.02)

(58) Field of Classification Search
CPC ..... H04W 24/06; H04W 4/029; H04W 24/10; H04W 64/00; H04W 16/20; H04B 17/318;
(Continued)

(56) References Cited

U.S. PATENT DOCUMENTS 10,735,976 B2 *  8/2020  Rumler ................. H04W 16/20
11,146,459 B2 * 10/2021  Lehman .............. H04L 41/0806
(Continued)

FOREIGN PATENT DOCUMENTS

JP        2019-012875 A      1/2019

OTHER PUBLICATIONS

International Search Report and Written Opinion issued in International Patent Application No. PCT/JP2020/005502, dated Mar. 24, 2020; with partial English translation.

*Primary Examiner* — Brian T O Connor
(74) *Attorney, Agent, or Firm* — Rimon P.C.

(57) ABSTRACT

A radio wave environment analyzer includes a memory that holds location information on a radio transmitter disposed in a target area where a moving body is present and location information on a reference point at which a radio wave from the radio transmitter is received, and a processor that obtains (i) a first reception intensity of the radio wave at the reference point when the moving body is present at an initial location and (ii) a plurality of second reception intensities of the radio wave at the reference point respectively corresponding to cases where the moving body is present at a plurality of movement locations. The processor selects one or more locations out of the plurality of movement locations to execute a simulation of a radio wave environment in the target area, based on the first reception intensity and the plurality of second reception intensities.

7 Claims, 11 Drawing Sheets

(58) Field of Classification Search
CPC ... H04B 17/3912; G06F 30/00; H04L 41/145; H04L 41/147; H04L 41/22
See application file for complete search history.

(56) References Cited

U.S. PATENT DOCUMENTS

| | | | |
|---|---|---|---|
| 11,150,322 B2* | 10/2021 | Jadav | H04W 4/33 |
| 11,212,650 B2* | 12/2021 | Ghourchian | G01S 7/415 |
| 11,343,004 B1* | 5/2022 | Nijim | G06T 11/206 |
| 11,563,796 B2* | 1/2023 | Hurst | H04L 67/10 |
| 2019/0005166 A1 | 1/2019 | Yamauchi et al. | |
| 2020/0100063 A1* | 3/2020 | Jadav | H04W 4/02 |
| 2023/0208904 A1* | 6/2023 | Hurst | H04L 67/025 370/252 |

* cited by examiner

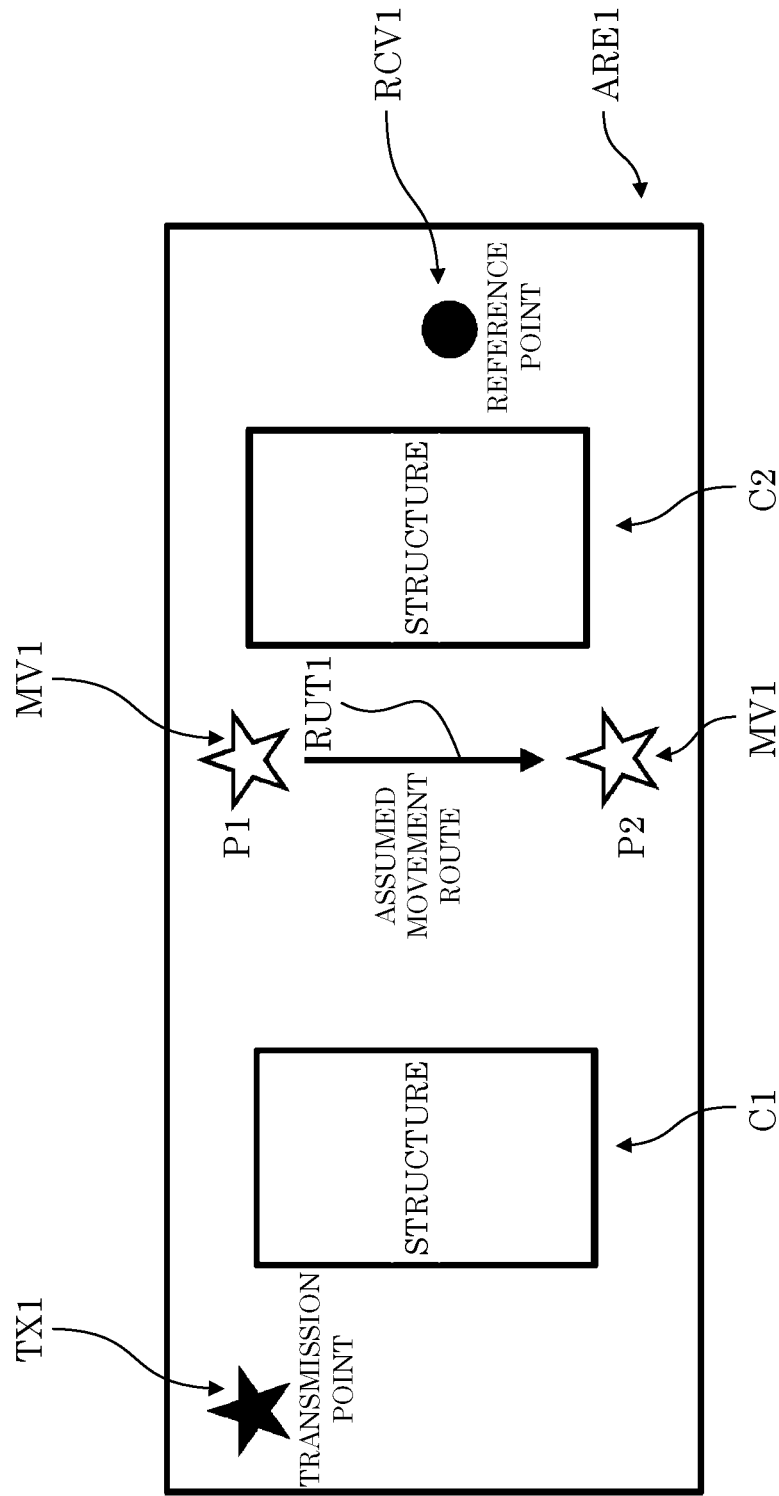

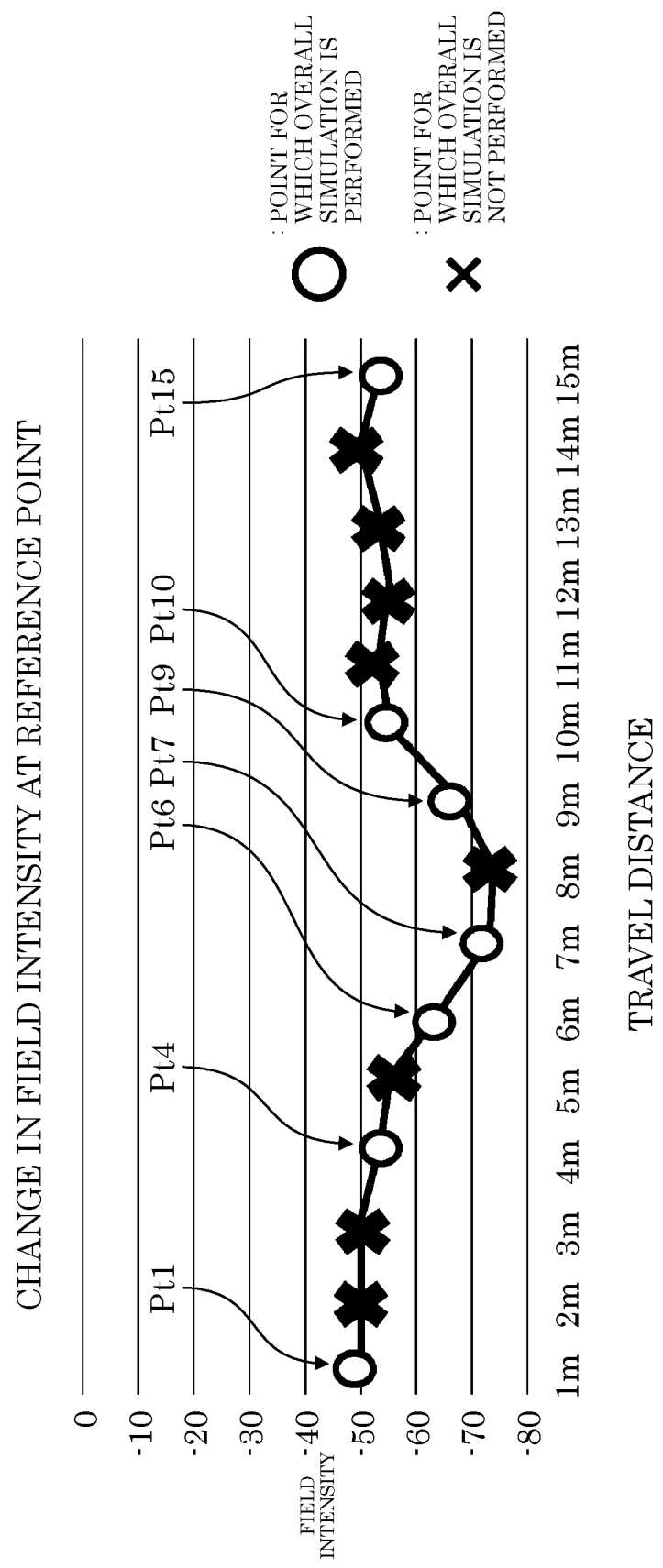

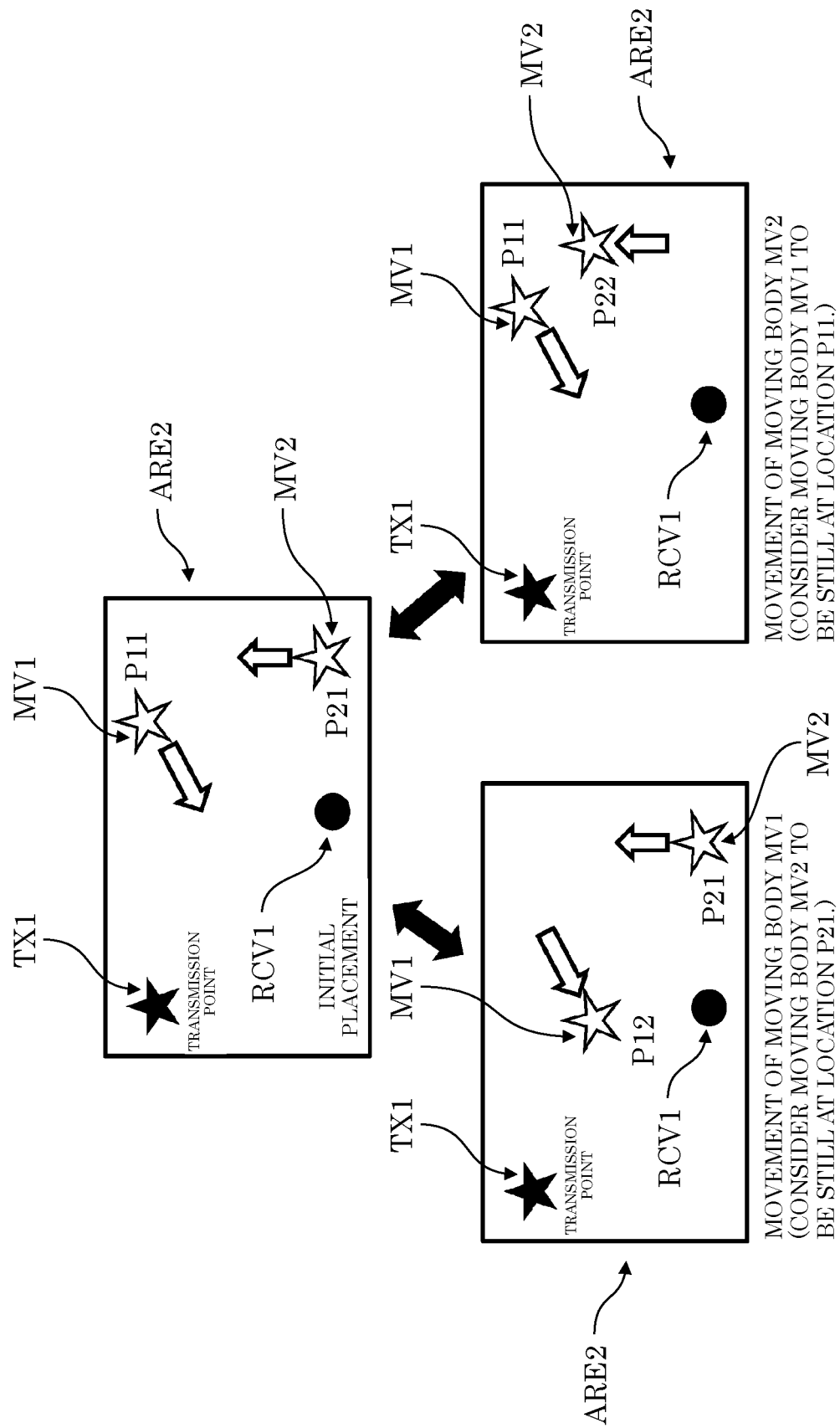

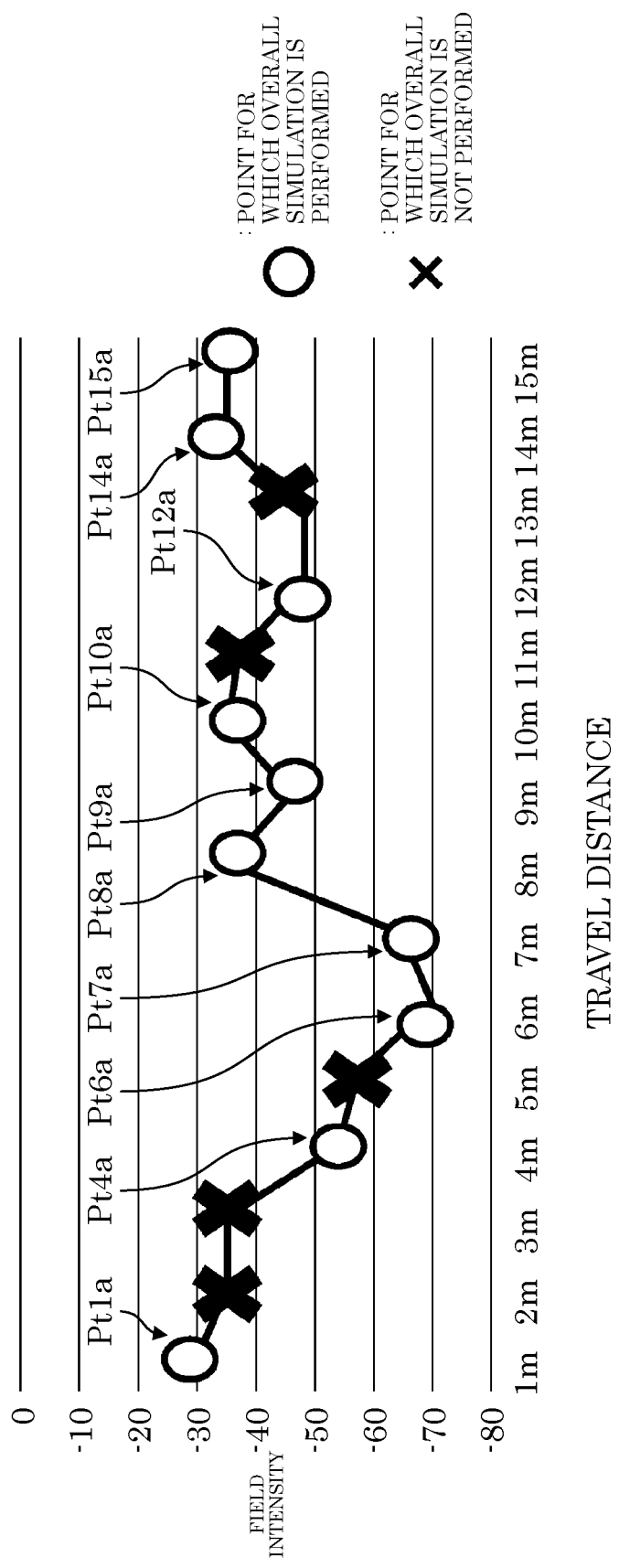

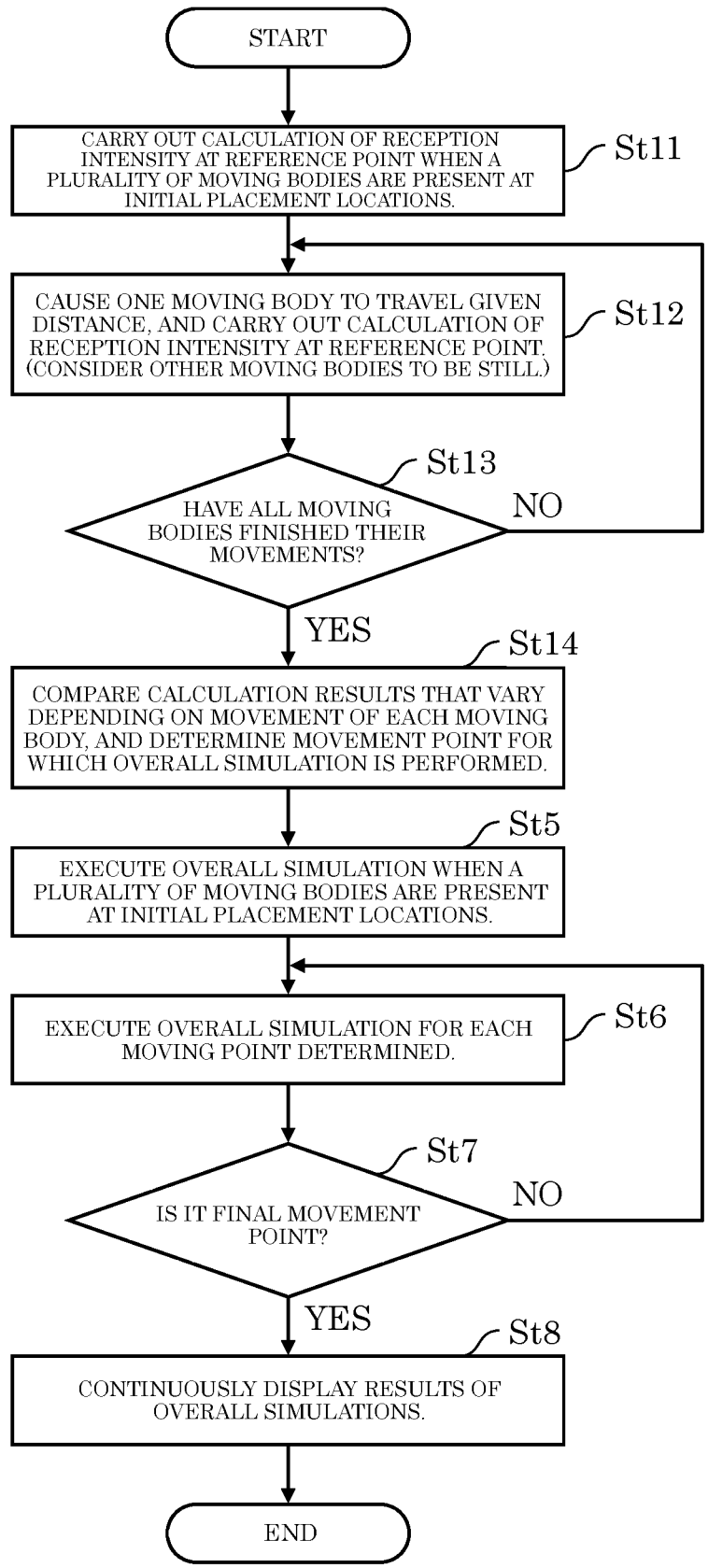

US 11,937,104 B2

RADIO WAVE ENVIRONMENT ANALYSIS DEVICE AND RADIO WAVE ENVIRONMENT ANALYSIS METHOD

BACKGROUND

1. Technical Field

The present disclosure relates to a radio wave environment analyzer and a radio wave environment analyzing method.

2. Description of the Related Art

Patent Literature (PTL) 1 discloses an installation location determining device for radio equipment that calculates, by a first simulation using a ray trace method (ray tracing method), installation candidate points lying at respective centers of a plurality of installation candidate locations, where a receiver is to be installed, and a first reception intensity at a neighboring point set within a first distance to each of the installation candidate points, based on device information on a transmitter and the receiver and information on an environment in which the transmitter and the receiver perform transmission and reception. The installation location determination device calculates a second reception intensity at each installation candidate location, based on a result of calculation of the first reception intensity, and determines an installation location of the receiver, based on the second reception intensity.

PTL 1 is Unexamined Japanese Patent Publication No. 2019-12875.

SUMMARY

The present disclosure has been conceived in view of the above-described conventional circumstances, and an object of the present disclosure is to provide a radio wave environment analyzer and a radio wave environment analyzing method that suppress an increase in the number of times of calculations in an overall simulation of a radio wave environment, the simulation being performed on a target area in which a moving body is present in an actual environment, and that efficiently execute an analysis process of the overall simulation of the radio wave environment.

A radio wave environment analyzer of the present disclosure includes: a memory that holds location information on a radio transmitter disposed in a target area where at least one moving body is present and location information on a reference point at which a radio wave from the radio transmitter is received; and a processor that obtains (i) a first reception intensity of the radio wave at the reference point when the at least one moving body is present at an initial location and (ii) a plurality of second reception intensities of the radio wave at the reference point respectively corresponding to cases where the at least one moving body is present at a plurality of movement locations the at least one moving body moving a plurality of times by a given distance from the initial location to travel to the plurality of movement locations. The processor selects one or more locations out of the plurality of movement locations to execute a simulation of a radio wave environment in the target area, based on the first reception intensity and the plurality of second reception intensities.

A radio wave environment analyzing method of the present disclosure includes the steps of holding location information on a radio transmitter disposed in a target area where a moving body is present and location information on a reference point at which a radio wave from the radio transmitter is received; obtaining (i) a first reception intensity of the radio wave at the reference point when the moving body is present at an initial location and (ii) a plurality of second reception intensities of the radio wave at the reference point respectively corresponding to cases where the moving body is present at a plurality of movement locations the at least one moving body moving a plurality of times by a given distance from the initial location to the plurality of movement locations; and selecting one or more locations out of the plurality of movement locations to execute a simulation of a radio wave environment in the target area, based on the first reception intensity and the plurality of second intensities.

The present disclosure suppresses an increase in the number of times of calculations in an overall simulation of a radio wave environment, the simulation being performed on a target area in which a moving body is present in an actual environment, and efficiently executes an analysis process of the overall simulation of the radio wave environment.

BRIEF DESCRIPTION OF DRAWINGS

FIG. 3 is a plan view schematically showing an example of a target area.

FIG. 4A is a graph showing a first example of changes in a field intensity that result at a reference point shown in FIG. 3 in correspondence to travel distances of a moving body.

FIG. 7 depicts an example of outline of operations of a radio wave environment analyzer according to a second exemplary embodiment.

FIG. 8A is a graph showing an example of changes in a field intensity that result at the reference point shown in FIG. 7 in correspondence to travel distances of moving body MV1.

FIG. 9 is a flowchart showing an example of an operation procedure of the radio wave environment analyzer according to the second exemplary embodiment.

Figure 1:
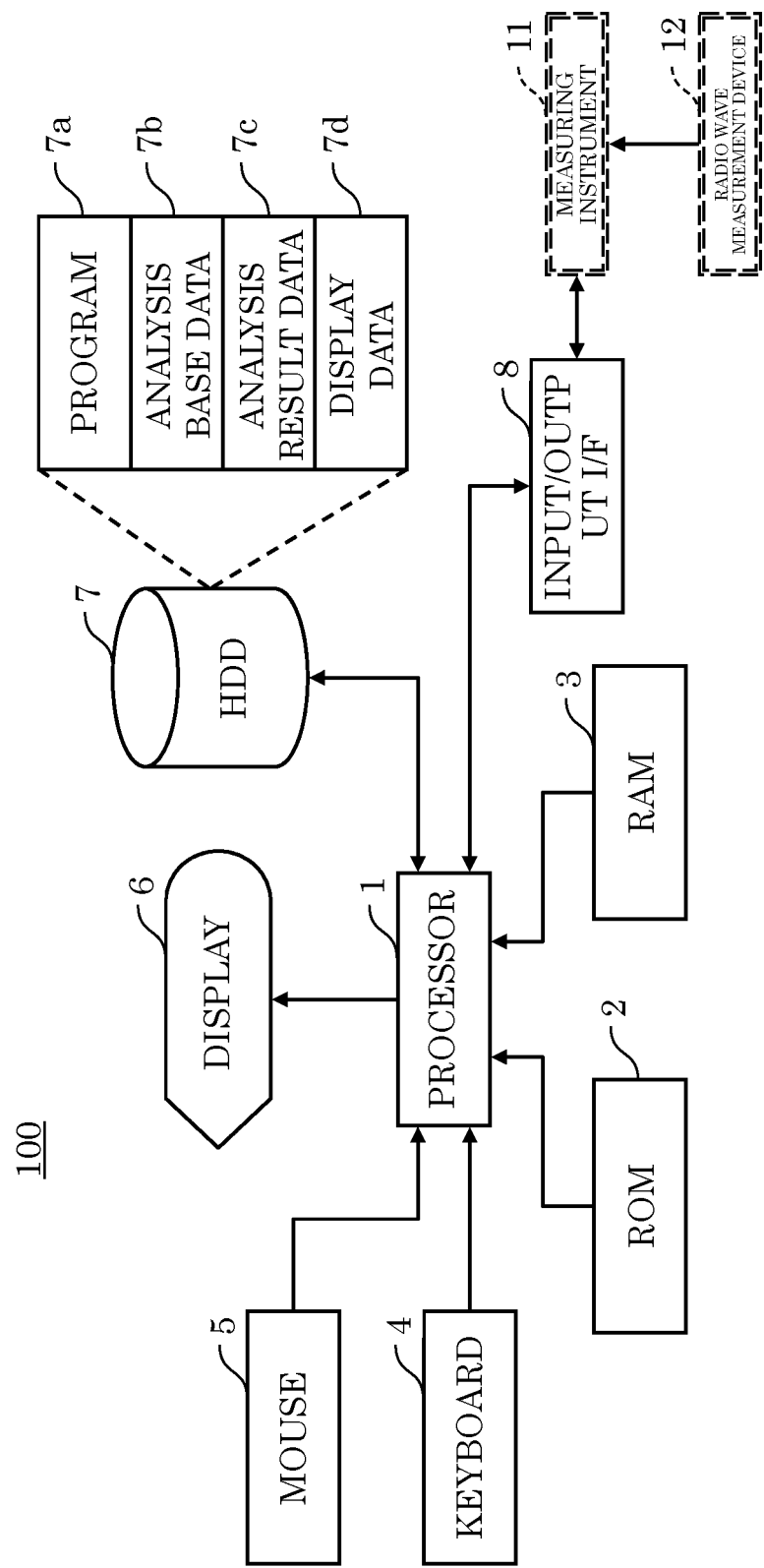
FIG. 1 is a block diagram showing a hardware configuration example of a radio wave environment analyzer according to a first exemplary embodiment.

DETAILED DESCRIPTION (Circumstances that have LED to the Present Disclosure)

A technique of Patent Literature 1 is based on use of a known ray tracing method, and this ray tracing method allows an overall simulation of a radio wave environment to be performed on a target area. However, the overall simulation of the radio wave environment using the ray tracing method poses a problem that a processor is subjected to a large load involving calculations (analyses) for the simulation. Besides, in an actual environment, a moving body, such as a person or an automated guided vehicle (AGV), i.e., so-called unmanned conveyance robot, present in the target area may move. In such a situation, performing the overall simulation of the radio wave environment for each location of the moving body leads to an enormous number of calculations, in which case an analysis process takes much time.

To address this problem, the following first exemplary embodiment will be described as an example of a radio wave environment analyzer and a radio wave environment analyzing method that suppress an increase in the number of times of calculations in an overall simulation of a radio wave environment, the simulation being performed on a target area in which a moving body is present in an actual environment, and that efficiently executes an analysis process of the overall simulation of the radio wave environment.

Hereinafter, exemplary embodiments will be described in detail, the exemplary embodiments specifically disclosing configurations and operations of the radio wave environment analyzer and the radio wave environment analyzing method according to the present disclosure, with proper reference to the drawings. It should be noted that an excessively detailed description may be omitted. For example, detailed description of matters already well-known and overlapping description of substantially the same configuration may be omitted. This is to avoid making the following description unnecessarily redundant and to facilitate understanding of those who are skilled in the art. The accompanying drawings and the following description are provided to allow those who are skilled in the art to sufficiently understand the present disclosure, and are not intended to limit the subject matter described in the claims.

First Exemplary Embodiment

In the following first exemplary embodiment, to make a judgment and decision on a proper installation location of a receiver, a radio transmitter (e.g., an access point) serving as a radio wave transmission source and a receiver that receives a radio wave from the radio transmitter (see a radio wave measurement device shown in FIG. 2) are arranged in a target area (which will hereinafter be abbreviated as an "area") specified for the purpose of calculating (in other words, simulating) and visualizing a radio wave environment. This area may be an indoor room or a wide area in an outdoor environment and the like.

In the following description, the radio wave environment refers to a reception intensity (an example of reception quality) at each point in an area that is calculated in an analysis process (in other words, simulation) by the radio wave environment analyzer when a radio wave is transmitted (emitted) from the radio transmitter disposed at a transmission point (i.e., location where the radio transmitter is disposed). The reception quality is, for example, reception field intensity (field intensity) or reception power.

(Configuration of Radio Wave Environment Analyzer)

Figure 6:
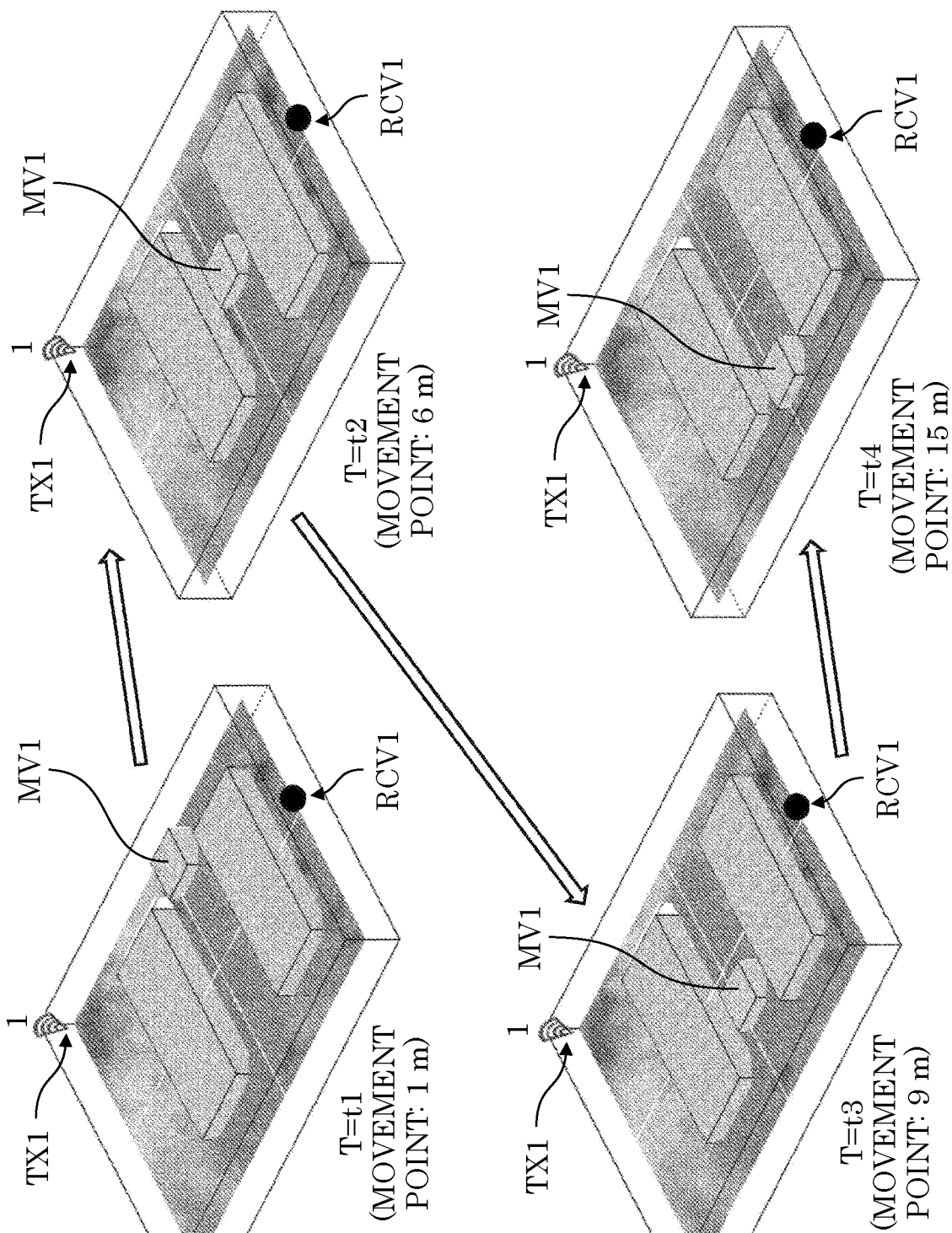
FIG. 6 depicts an example of results of overall simulations of a radio wave environment in the target area, the results corresponding to locations of the moving body shown in FIG. 3.

FIG. 1 is a block diagram showing a hardware configuration example of radio wave environment analyzer 100 according to the first exemplary embodiment. Radio wave environment analyzer 100 executes an analysis process of a radio wave environment in area ARE1, using analysis base data 7b on area ARE1 where transmission point TX1 (see FIG. 3), at which the radio transmitter as the radio wave transmission source is disposed, is present. The analysis process of the radio wave environment is a process of executing a simulation of the radio wave environment and calculating reception quality (see the above description) when a radio wave from the transmission point is received at reference point RCV1 (see FIG. 3) in area ARE1. Radio wave environment analyzer 100 displays analysis result data based on the analysis process (e.g., a field intensity distribution diagram or the like showing with what field intensity a radio wave from the transmission point is received at each point in area ARE1), which is shown in FIG. 6.

Radio wave environment analyzer 100 includes processor 1, read-only memory (ROM) 2, random access memory (RAM) 3, keyboard 4, mouse 5, display 6, hard disk drive (HDD) 7, and input/output interface 8. ROM 2, RAM 3, keyboard 4, mouse 5, display 6, HDD 7, and input/output interface 8 are connected to processor 1 through an internal bus or the like so that they can exchange input/output data or information with processor 1. In FIG. 1, for simpler description, the interface is abbreviated as an "I/F".

Processor 1 is composed of, for example, a central processing unit (CPU), a micro processing unit (MPU), a digital signal processor (DSP), or a field programmable gate array (FPGA). Processor 1 functions as a controller of radio wave environment analyzer 100, and performs a control process of comprehensively controlling operations of respective component units of radio wave environment analyzer 100, a process of exchanging input/output data or information with respective component units of radio wave environment analyzer 100, a process of calculating data, and a process of storing data or information. Processor 1 operates according to program 7a stored in HDD 7. Processor 1 uses ROM 2 and RAM 3 upon executing a process to acquire current time information, and outputs analysis result data 7c generated by an analysis process (see FIG. 5), which will be described later, to display 6 to cause it to display analysis result data 7c.

ROM 2 is a read-only memory, and stores in advance an operating system (OS), which is basic software, and application programs and data for radio wave environment analysis process. The OS, which is a program, is booted at the start of radio wave environment analyzer 100. The application programs are started and executed according to operations by a user of radio wave environment analyzer 100.

RAM 3 is a writable and readable memory, is used as a work memory at execution of the analysis process of various radio wave environments (see FIG. 5), and temporarily holds data or information used or generated at execution of the analysis process of various radio wave environments.

Keyboard 4 and mouse 5, which are examples of operation input units, function as a human interface with the user, and receive input operations from the user. In other words, keyboard 4 and mouse 5 are used for inputs or instructions that are given in various processes executed by radio wave environment analyzer 100.

Display 6, which is an example of a display unit, is composed of, for example, a display device such as a liquid crystal display (LCD) or an organic electroluminescence (EL) display. Display 6 functions as a human interface with the user, and displays display data 7d indicating various setting details, an operation status of radio wave environment analyzer 100, and various calculation results and analysis results.

HDD 7, which is an example of a memory, stores program 7a for executing the analysis process of the radio wave environment (see FIG. 5), analysis base data 7b that is used upon execution of the analysis process of the radio wave environment, analysis result data 7c equivalent to an analysis result given by the analysis process of the radio wave environment, and display data 7d generated based on analysis result data 7c. Analysis base data 7b includes, for example, data of a map or layout of the interior of area ARE1, structure data in which the number of structures (i.e., scatterers that block the progress of a radio wave) placed in the area ARE1, respective types (e.g., materials) of the structures, and material constants (e.g., reflectance and transmittance) corresponding to the types are correlated with each other, and various data or information, such as a placement location of the radio transmitter in area ARE1. Analysis base data 7b includes information on the types and number of moving bodies (e.g., persons or unmanned conveyance robots, such as AGVs) in area ARE1.

Program 7a for analyzing the radio wave environment in area ARE1 is read out of HDD 7 and loaded onto RAM 3 by processor 1 and is executed by processor 1. This program 7a may be recorded in a recording medium (e.g., a DVD-ROM, which is not illustrated) different from HDD 7 and read by a corresponding reader (e.g., a DVD-ROM drive, which is not illustrated) into RAM 3.

As described above, specifically, analysis base data 7b used in the analysis process of the radio wave environment in area ARE1 includes, for example, the following data or information:

(1) Data on the transmission power (dBm), the frequency, the modulation scheme, and the like of a radio wave from the radio transmitter disposed in area ARE1, the gain and the placement location of an antenna, the height of the placement location, and the like;

(2) Data on the gain of an antenna of the radio receiver, the height of a placement location of the radio receiver, and the like, the gain and placement location being assume at a point in area ARE1 (i.e., an assumed radio wave reception point);

(3) Data on the two-dimensional or three-dimensional size of area ARE1;

(4) Structure data in which the number of structures arranged in area ARE1, three-dimensional sizes of the structures (i.e., scatterers that block the progress of a radio wave), material constants (e.g., transmittance and reflectance) of the structures, and locations (i.e., two-dimensional coordinates in the area) of the structures are correlated with each other;

(5) Set value data on a lower limit value (e.g., −100 dBm) of reception quality (e.g., reception power) that is calculated based the analysis process; and (6) Data on the location of reference point RCV1, the height of reference point RCV1, and the like.

Based on analysis base data 7b described above, radio wave environment analyzer 100 according to the first exemplary embodiment can calculate a reception field intensity of a radio wave at each point in area ARE1, using, for example, a known ray tracing method or a known statistical estimation method. In the first exemplary embodiment, therefore, detailed description of a method of calculating a reception field intensity of a radio wave at a point in area ARE1 is omitted.

Input/output interface 8 functions as an interface that exchanges input/output data or information with radio wave environment analyzer 100, and is composed of, for example, a connector, another connector, a cable, and the like that are physically connected to, for example, measuring instrument 11. According to the first exemplary embodiment, radio wave environment analyzer 100 is connected to measuring instrument 11 via input/output interface 8. The above cable includes, for example, a universal serial bus (USB) cable (not illustrated).

Measuring instrument 11 is connected to radio wave measurement device 12 (see FIG. 2) via a cable (not illustrated), radio wave measurement device 12 serving as a receiver that receives a radio wave transmitted from the radio transmitter in area ARE1. Measuring instrument 11 is connected also to radio wave environment analyzer 100 via input/output interface 8. Measuring instrument 11 measures reception power (in other words, reception radio wave intensity) and a delay spread related to radio wave reception, based on detected output of a radio wave received by radio wave measurement device 12. When measuring reception power, measuring instrument 11 can measure radio wave intensities of a horizontally polarized wave and a vertically polarized wave having their respective frequencies, based on detected outputs from a horizontal polarization antenna and a vertical polarization antenna that are arranged on each surface of radio wave measurement device 12, by using, for example, a spectrum analyzer. When measuring a delay spread, measuring instrument 11 can identify the incoming direction of a reflected wave, based on detected outputs from the horizontal polarization antenna and the vertical polarization antenna that are arranged on each surface of radio wave measurement device 12, and determine whether an obstacle (scatterer), such as a wall surface, absorbs a radio wave, by using, for example, a network analyzer.

When the radio wave environment is measured at reference point RCV1 in area ARE1, radio wave measurement device 12 is placed at a given height at reference point RCV1. Radio wave measurement device 12 receives a radio wave, which is transmitted from transmission point TX1, at reference point RCV1 at each point of time at which moving body MV1 has traveled a given distance from an initial placement point (initial location) in area ARE1. Radio wave measurement device 12 outputs detected output of the received radio wave (e.g., characteristics, such as waveform, of the received signal) to measuring instrument 11. In the first exemplary embodiment, a reception intensity (e.g., field intensity) of a radio wave at reference point RCV1 when moving body MV1 (see description to follow) is present at each location along movement route RUT1 may be obtained by measurement (actual measurement) using measuring instrument 11 and radio wave measurement device 12 or by calculation (pinpoint simulation) by radio wave environment analyzer 100. In the latter case, the configurations of measuring instrument 11 and radio wave measurement device 12 may be omitted.

Now the shape of radio wave measurement device 12 will be described with reference to FIG. 2.

Figure 2:
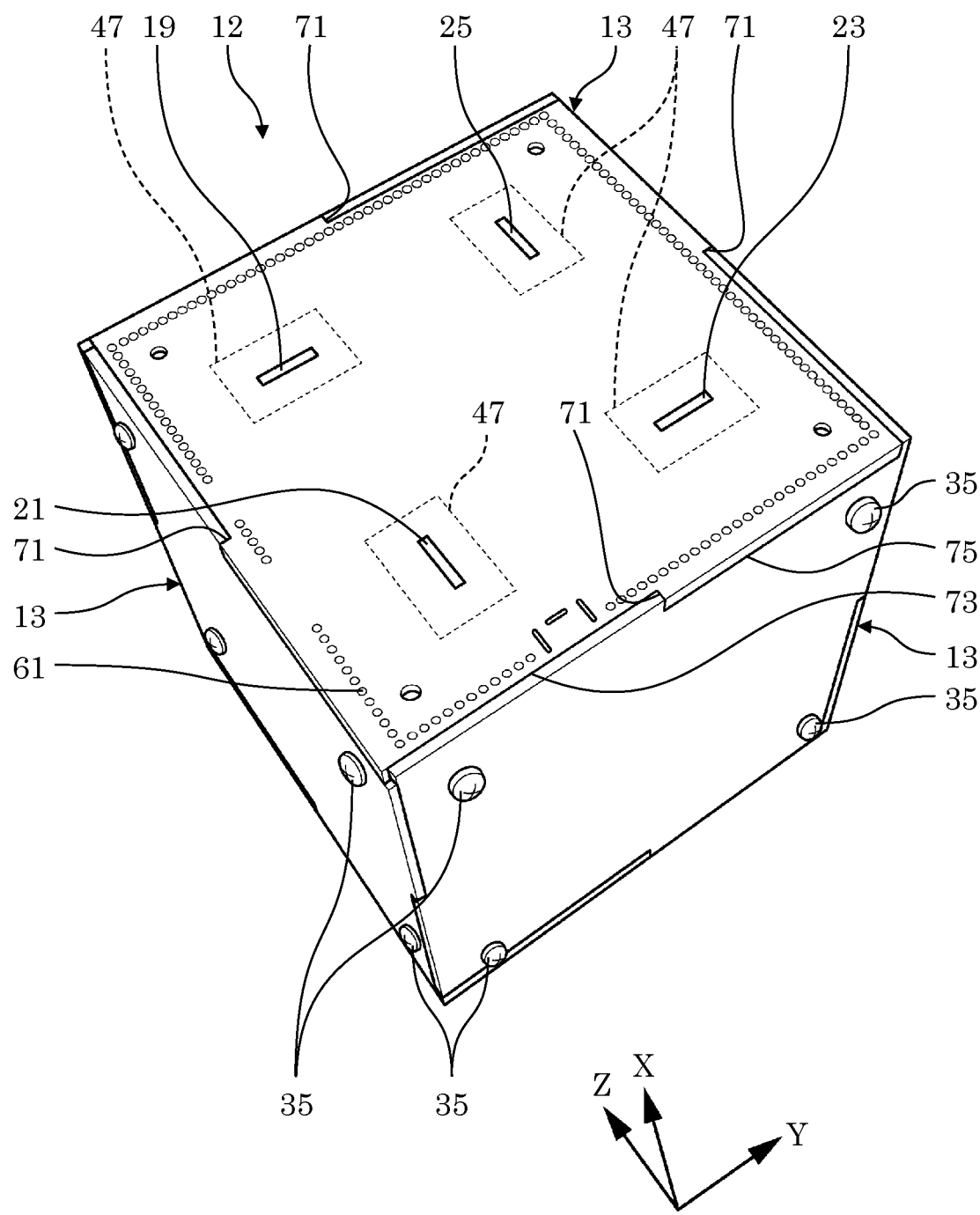
FIG. 2 is a perspective view showing an appearance of a radio wave measurement device.

FIG. 2 is a perspective view showing an appearance of radio wave measurement device 12. In the description of radio wave measurement device 12, directions of an X axis, a Y axis, and a Z axis are defined respectively as directions of arrows shown in FIG. 2. Specifically, a +X direction and a −X direction correspond to the vertical direction of a housing of radio wave measurement device 12, a −Y direction and a +Y direction correspond to the horizontal direction of the housing of radio wave measurement device 12, and a −Z direction and a +Z direction correspond to the front-to-rear direction of the housing of radio wave measurement device 12.

Radio wave measurement device 12 has a laminated substrate 13, which is an example of a surface material, and a frame disposed inside the housing of radio wave measurement device 12, as main constituent elements. In radio wave measurement device 12, laminated substrate 13 and the frame make up the housing of a polyhedron (e.g., hexahedron). The housing of radio wave measurement device 12 is, for example, a hexahedron, and is shown as a cube in FIG. 2. Laminated substrate 13 is screwed down to each of surfaces of the cube by, for example, fastening screws 35.

The surface material making up the housing of radio wave measurement device 12 is not limited to laminated substrate 13. Furthermore, the polyhedron is not limited to a hexahedron, and may be, for example, a tetrahedron, a dodecahedron, or the like.

In radio wave measurement device 12, two sets (one or more sets) of antennas are provided on laminated substrate 13 disposed on one upper surface, on laminated substrates 13 disposed respectively on four side surfaces, and on laminated substrate 13 disposed on one lower surface. As a result, radio wave measurement device 12 is able to receive incoming radio waves in six directions in total, the six directions corresponding to six surfaces, i.e., the number of laminated substrates 13 (number of surfaces). When radio waves are measured as the lower surface of radio wave measurement device 12 is fixed to a given surface to which the radio wave measurement device 12 is mounted, the lower surface of radio wave measurement device 12 may not have laminated substrate 13 carrying antennas. FIG. 2 shows antennas provided on laminated substrate 13 disposed on the above upper surface, but does not show antennas provided on other surfaces (specifically, antennas provided on laminated substrates 13 disposed respectively on the above four side surfaces and antennas provided on laminated substrate 13 disposed on one lower surface).

The antennas arranged on each laminated substrate 13 are, for example, dipole antennas. The dipole antennas are formed on, for example, laminated substrate 13, where dipole antenna patterns are formed by performing etching or the like on a surface metal foil. The resulting plurality of layers are made of, for example, copper foil, glass epoxy, or the like, respectively.

On each laminated substrate 13 of the cubic housing of radio wave measurement device 12, for example, a set of horizontal polarization antenna 19 and vertical polarization antenna 21 in a 2.4 GHz band and a set of horizontal polarization antenna 23 and vertical polarization antenna 25 in a 5 GHz band are provided on the surface (upper layer), as two sets of antennas.

Artificial magnetic conductor (AMC) 47 has perfect magnetic conductor (PMC) characteristics, and is formed of a given metal pattern. By using AMC 47, each antenna of radio wave measurement device 12 can be disposed in parallel with laminated substrate 13, which allows a reduction in an overall size. In addition, through a grounding conductor, AMC 47 is prevented from receiving radio waves from other directions, which increases the gain of the antenna.

In radio wave measurement device 12, a plurality of grounding via conductors 61 are lined up along each of four edges, i.e., four sides of laminated substrate 13. Grounding via conductors 61 may be arranged in a row at equal intervals. In addition, grounding via conductors 61 may be arranged at pitches (intervals) sufficient to block a radio wave from outside of radio wave measurement device 12, in accordance with the frequency band (in other words, a wavelength) corresponding to the antenna conductors arranged on laminated substrate 13. Grounding via conductors 61 are formed in such a way as to penetrate laminated substrate 13 from its upper surface to lower surface.

In radio wave measurement device 12, laminated substrate 13 is formed as, for example, a quadrangular shape. On laminated substrate 13, each side has recess 73 and protrusion 75 extending in a direction along the side, from one step 71 formed at the center of the side as a boundary. In other words, as shown in FIG. 2, the housing of radio wave measurement device 12 is assembled by fitting together recesses 73 and protrusions 75 of laminated substrates 13 adjacent to each other.

FIG. 3 is a plan view schematically showing an example of target area ARE1. Area ARE1 will be described as, for example, a closed space of a factory, an office, a public facility, and the like. Here, to facilitate understanding, description will be made on the assumption that area ARE1 is a space of a factory.

In area ARE1 in the factory, transmission point TX1, at which a radio transmitter is disposed, is provided on one end side while reference point RCV1, which serves as a reception point, is provided on the other end side opposite to the one end side. In addition, between transmission point TX1 and reference point RCV1, for example, two types of structures C1, C2 used in the factory are arranged. Structures C1, C2 are immovable scatterers (see the above description) that block the progress of radio waves. They are, for example, metal warehouses, wooden desks, or immovable machines, but are not necessarily limited to these objects.

Between transmission point TX1 and reference point RCV1, moving body MV1 moves along movement route RUT1, through which moving body MV1 travels given distance by given distance (that is, interval by interval, e.g., 1 m by 1 m) to move from location P1, which is an initial placement location, to location P2. The moving body too is a movable scatterer (see the above description) that blocks the progress of the radio wave. It is, for example, a person or an unmanned conveyance robot, but is not necessarily limited to the person or an unmanned conveyance robot. It is assumed in this case that moving body MV1 travels 1 m by 1 m in a linear distance of 15 m from location P1, i.e., initial placement location to location P2. It should be noted that movement route RUT1 for moving body MV1 is not limited to the linear route shown in FIG. 3.

According to the first exemplary embodiment, as radio wave measurement device 12 (see FIG. 2) is placed at reference point RCV1, radio wave environment analyzer 100 obtains a reception intensity (e.g., field intensity) of a radio wave at reference point RCV1 when moving body MV1 is present at location P1, i.e., initial placement location and at each point of time at which moving body MV1 has traveled a given distance (e.g., 1 m) during its traveling given distance by given distance from location P1 to location P2 along movement route RUT1. Radio wave environment analyzer 100 generates a graph shown in FIG. 4A or 4B, using calculated reception intensities (e.g., field intensities) of the radio wave at reference point RCV1, the reception intensities being obtained for respective locations of moving body MV1.

Figure 4B:
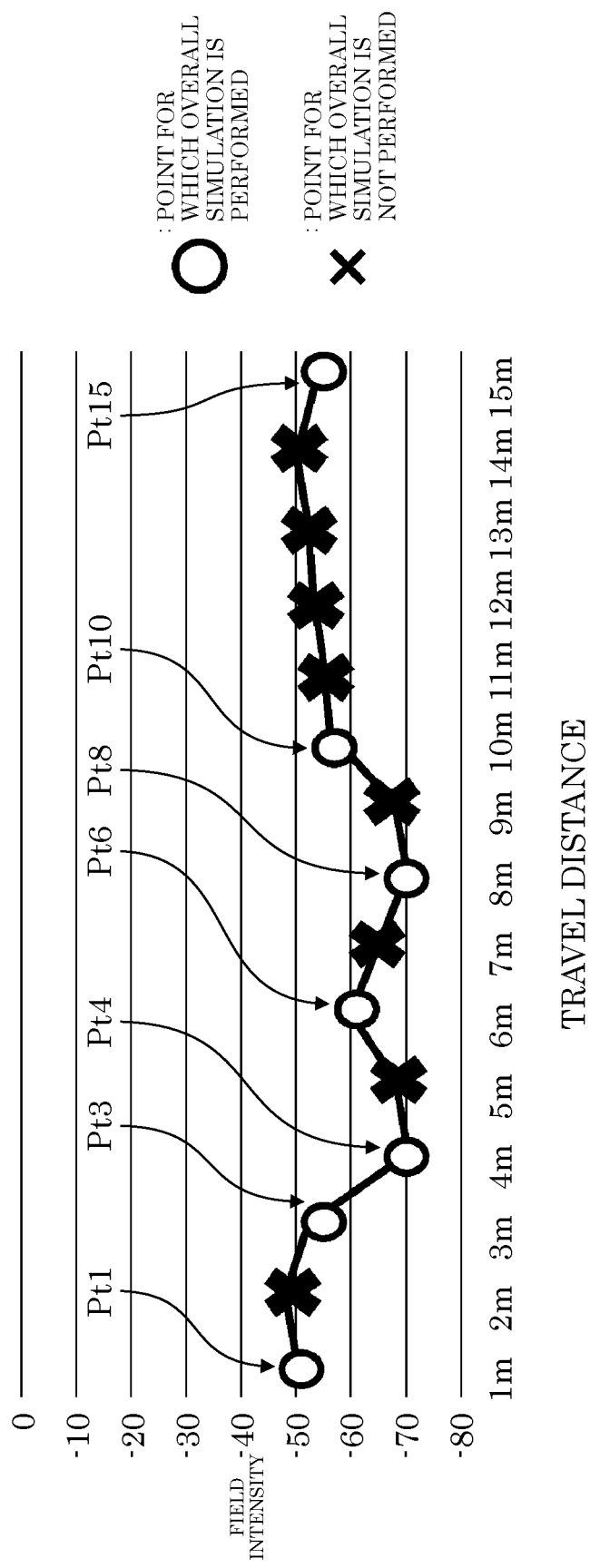
FIG. 4B is a graph showing a second example of changes in a field intensity that result at the reference point shown in FIG. 3 in correspondence to travel distances of the moving body.

FIGS. 4A and 4B are graphs showing first and second examples of changes in a field intensity that result at reference point RCV1 shown in FIG. 3 in correspondence to travel distances of moving body MV1. FIGS. 4A and 4B show results of calculations that are made respectively under conditions in which, for example, the types of structures C1, C2 (e.g., wooden or metallic) and the number of the same are different from each other.

The horizontal axis of each of the graphs shown in FIGS. 4A and 4B represents travel distances [m] of moving body MV1, and the vertical axis of the same represents field intensities at reference point RCV1. When a travel distance of moving body MV1 is 1 m, it indicates that moving body MV1 has traveled 1 m along movement route RUT1 from location P1 (see FIG. 3), i.e., initial placement location. Likewise, when a travel distance of moving body MV1 is 15 m, it indicates that moving body MV1 has traveled 15 m along movement route RUT1 from location P1 (see FIG. 3), i.e., initial placement location. A location to which moving body MV1 has moved by traveling 15 m along movement route RUT1 is defined as location P2. A moving means of moving body MV1 may be artificial one or mechanical one, and the type of the moving means is not a matter of concern.

After moving body MV1 has finished moving from location P1, i.e., initial placement location to location P2, i.e., a final location, along movement route RUT1, radio wave environment analyzer 100 compares a field intensity at reference point RCV1 before one round of movement (travel) of moving body MV1 with a field intensity at reference point RCV1 after one round of movement (travel) of moving body MV1. For example, radio wave environment analyzer 100 compares a field intensity at reference point RCV1 when moving body MV1 is present at location P1, i.e., initial placement location with a field intensity at reference point RCV1 at a point of time right after moving body MV1 has traveled 1 m from location P1 along movement route RUT1. Radio wave environment analyzer 100 also compares a field intensity at reference point RCV1 when moving body MV1 is present at the location to which moving body has moved by traveling 1 m along movement route RUT1 with a field intensity at reference point RCV1 when moving body MV1 is present at a location to which moving body MV1 has moved by traveling 2 m along movement route RUT1. In the same manner, radio wave environment analyzer 100 also compares a field intensity at reference point RCV1 when moving body MV1 is present at a location to which moving body has moved by traveling 14 m along movement route RUT1 with a field intensity at reference point RCV1 when moving body MV1 is present at a location P2 to which moving body MV1 has moved by traveling 15 m along movement route RUT1. Hereinafter, to make description understandable, two field intensities to be compared will be expressed in the following manner: a field intensity at reference point RCV1 when moving body MV1 is present at a location before its movement is referred to as "pre-movement field intensity" (i.e., pre-movement reception intensity), while a field intensity at reference point RCV1 when moving body MV1 is present at a location after its movement is referred to as "post-movement field intensity" (i.e., post-movement reception intensity).

Radio wave environment analyzer 100 compares the pre-movement field intensity with the post-movement field intensity every time moving body MV1 moves, and determines whether a difference between the pre-movement field intensity and the post-movement field intensity is equal to or larger than a preset threshold. When determining that the difference between the pre-movement field intensity and the post-movement field intensity is equal to or larger than the preset threshold, radio wave environment analyzer 100 determines a location of moving body MV1 at the time of obtaining the post-movement field intensity to be a location of moving body MV1 for which an overall simulation of a radio wave environment of area ARE1 is carried out, using the ray tracing method (which location will hereinafter be referred to as a "movement point"). In other words, when determining that the difference between the pre-movement field intensity and the post-movement field intensity is less than the preset threshold, radio wave environment analyzer 100 determines not to adopt a location of moving body MV1 at the time of obtaining the post-movement field intensity, as the above movement point. This is because that, if the field intensity of the radio wave at reference point RCV1 changes by a minute value smaller than the threshold when moving body MV1 travels given distance by given distance (e.g., 1 m by 1 m), it is less necessary to adopt the location of moving body MV1 at the time of obtaining the post-movement field intensity, as the movement point for executing the overall simulation that involves heavy calculation loads. Specifically, when the field intensity of the radio wave at reference point RCV1 changes by a value smaller than the threshold when moving body MV1 travels given distance by given distance (e.g., 1 m by 1 m), the location of moving body MV1 at the time of obtaining the post-movement field intensity is omitted from the simulation so that load on radio wave environment analyzer 100 at execution of the overall simulation is reduced.

According to the above method of adopting the movement point, radio wave environment analyzer 100 narrows down (determines) movement points for executing the overall simulation to locations P1, Pt1, Pt4, Pt6, Pt7, Pt9, Pt10, Pt15 (i.e., location P2) representing respective locations of moving body MV1. Specifically, radio wave environment analyzer 100 narrows down a total of 16 points, which moving body MV1 would pass through the course of movement from location P1, i.e., initial placement location to location P2, i.e., final location along movement route RUT1, into a total of 8 points, which are selected as movement points for executing the overall simulation.

It should be noted that location Pt1 is a location to which moving body MV1 has moved by traveling 1 m from location P1 along movement route RUT1. Location Pt4 is a location to which moving body MV1 has moved by traveling 4 m from location P1 along movement route RUT1. Location Pt6 is a location to which moving body MV1 has moved by traveling 6 m from location P1 along movement route RUT1. Location Pt7 is a location to which moving body MV1 has moved by traveling 7 m from location P1 along movement route RUT1. Location Pt9 is a location to which moving body MV1 has moved by traveling 9 m from location P1 along movement route RUT1. Location Pt10 is a location to which moving body MV1 has moved by traveling 10 m from location P1 along movement route RUT1. Location Pt15 (i.e., location P2) is a location to which moving body MV1 has moved by traveling 15 m from location P1 along movement route RUT1.

The graph shown in FIG. 4A and the graph shown in FIG. 4B are different, for example, in the types of structures C1, C2 arranged in area ARE1. Similarly, in the case of FIG. 4B, according to the above method of adopting the movement point, radio wave environment analyzer 100 narrows down (determines) movement points for executing the overall simulation to locations P1, Pt1, Pt3, Pt4, Pt6, Pt8, Pt10, Pt15 (i.e., location P2) representing respective locations of moving body MV1. Specifically, radio wave environment analyzer 100 narrows down a total of 16 points, which moving body MV1 would pass through the course of movement from location P1, i.e., initial placement location to location P2, i.e., final location along movement route RUT1, into a total of 8 points, which are selected as movement points for executing the overall simulation.

(Operations of Radio Wave Environment Analyzer)

Figure 5:
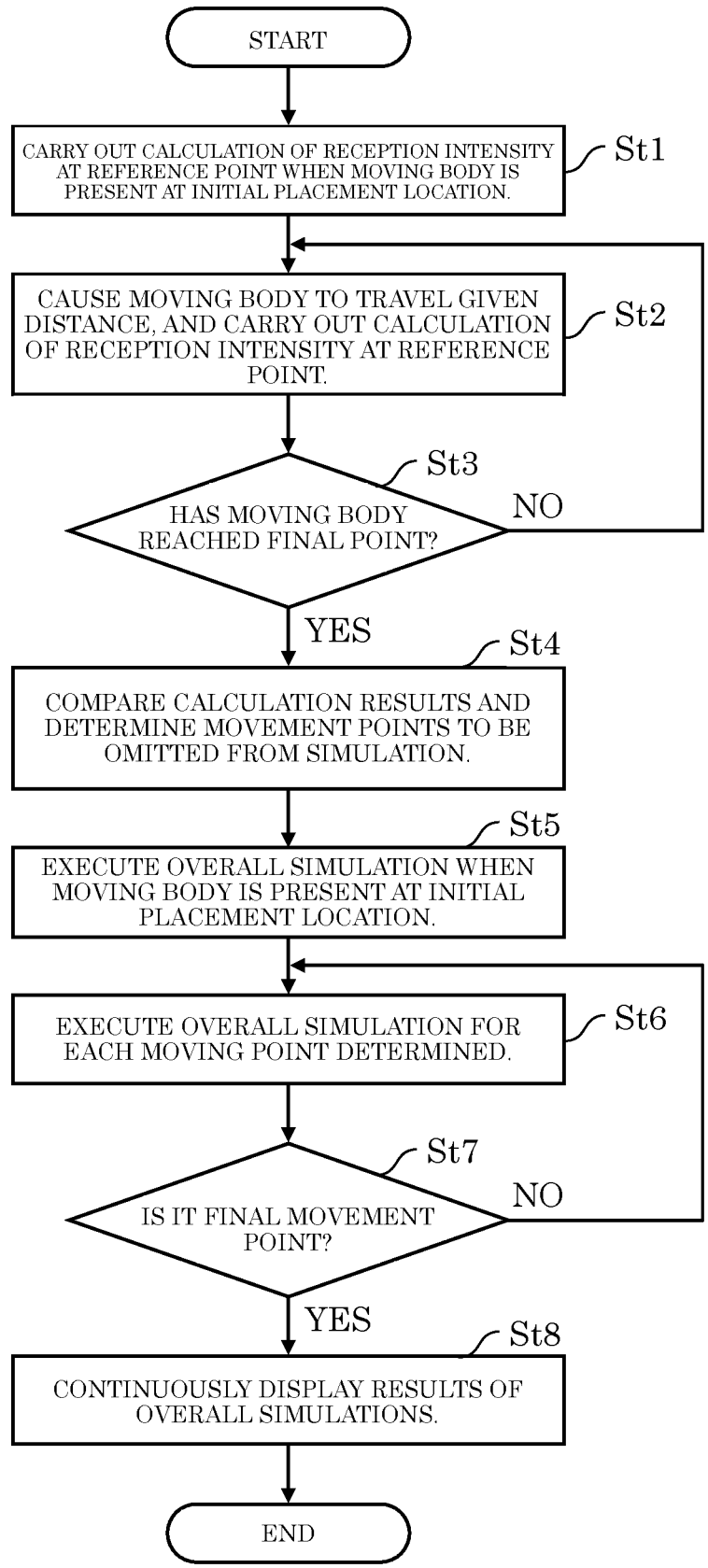
FIG. 5 is a flowchart showing an example of an operation procedure of the radio wave environment analyzer according to the first exemplary embodiment.

Operations of radio wave environment analyzer 100 according to the first exemplary embodiment will then be described with reference to FIG. 5. FIG. 5 is a flowchart showing an example of an operation procedure of radio wave environment analyzer 100. Each of operation processes (steps) shown in FIG. 5 is executed in principle by processor 1 of radio wave environment analyzer 100.

In FIG. 5, when moving body MV1 is present at location P1, i.e., initial placement location in area ARE1, radio wave environment analyzer 100 carries out a calculation of a field intensity (i.e., a first reception intensity) of a radio wave at reference point RCV1, the radio wave being transmitted from transmission point TX1 (St1). The calculation of the field intensity at reference point RCV1 is a process of calculating the field intensity of a limited area including reference point RCV1 and its surroundings by simulation (in other words, a process of simulation on a small scale). A process of simulation on a small scale means a simulation process in which a target area to be subjected to the calculation is not the whole of area ARE1 but is limited to reference point RCV1 and its surroundings. This process of simulation on a small scale allows avoiding a case where a simulation of the whole of area ARE1 increases the volume of calculations and consequently increases load on radio wave environment analyzer 100. It should be noted that the field intensity at reference point RCV1 may be obtained by the above described calculation (process of simulation on a small scale) or may be obtained by actual measurement using measuring instrument 11 and radio wave measurement device 12 (see FIG. 1). This applies also to exemplary embodiments to be described below.

Subsequently, when moving body MV1 has traveled a given distance (e.g., 1 m) from location P1, i.e., initial placement location along movement route RUT1 in area ARE1, radio wave environment analyzer 100 carries out a calculation of a field intensity (i.e., a second reception intensity) of a radio wave at reference point RCV1 in the same manner (St2).

When moving body MV1 has not yet reached the final point (i.e., location P2) along movement route RUT1 (St3, NO), radio wave environment analyzer 100 repeatedly carries out calculations of field intensities (i.e., second reception intensities) at reference point RCV1 when moving body MV1 is present at other locations (points) of moving body MV1, until moving body MV1 reaches the final point (i.e., location P2) along movement route RUT1 (St2).

When moving body MV1 has reached the final point (i.e., location P2) along movement route RUT1 (St3, YES), radio wave environment analyzer 100 compares a field intensity at reference point RCV1 before one round of movement of moving body MV1 with a field intensity at reference point RCV1 after one round of movement of moving body MV1 (St4). Radio wave environment analyzer 100 thus compares the pre-movement field intensity with the post-movement field intensity every time moving body MV1 moves, and determines whether a difference between the pre-movement field intensity and the post-movement field intensity is equal to or larger than the preset threshold (St4). When determining that the difference between the pre-movement field intensity and the post-movement field intensity is equal to or larger than the preset threshold, radio wave environment analyzer 100 determines a location of moving body MV1 at the time of obtaining the post-movement field intensity to be a movement point of moving body MV1 for which an overall simulation of a radio wave environment of area ARE1 is carried out, using the ray tracing method (St4, see FIG. 4A or FIG. 4B).

Following step St4, radio wave environment analyzer 100 carries out a calculation for the overall simulation of the radio wave environment of area ARE1 when the moving body MV1 is present at location P1, i.e., initial placement location (St5). Further, for each of movement points determined (obtained by narrowing down the entire movement points) at step St4 (e.g., each of 8 movement points in the case of FIG. 4A), radio wave environment analyzer 100 carries out a calculation for the overall simulation of the radio wave environment of area ARE1 when moving body MV1 is present in area ARE1 (St6).

When a calculation for the overall simulation of the radio wave environment of area ARE1 when moving body MV1 is present at the final movement point is not completed yet (St7, NO), radio wave environment analyzer 100 carries out individual calculations for the overall simulations of the radio wave environment of area ARE1 when moving body MV1 is present at other movement points, until the calculation for the overall simulation of the radio wave environment of area ARE1 when moving body MV1 is present the final movement point is completed (St6).

When the calculation for the overall simulation of the radio wave environment of area ARE1 when moving body MV1 is present at the final movement point is completed (St7, YES), on the other hand, radio wave environment analyzer 100 causes display 6 to continuously display results of a series of overall simulations of the radio wave environment of area ARE1 that are executed at step St6 (see FIG. 6), the results being obtained for movement points of moving body MV1, respectively (St8).

FIG. 6 depicts an example of results of overall simulations of the radio wave environment in area ARE1, the results corresponding to locations of moving body MV1 shown in FIG. 3. FIG. 6 shows a result of execution of an overall simulation of a radio wave environment of area ARE1 in which moving body MV1 is moving along movement route RUT1, and a result of execution of an overall simulation of a radio wave environment of area ARE1 when moving body MV1 has moved to final location P2. In each of the results of execution of the overall simulations, respective locations of transmission point TX1, moving body MV1, and reference point RCV1 are indicated clearly, and grayscale imaging is adopted so that a field intensity (reception intensity) of a radio wave is understood.

At time T=t1 in FIG. 6, a result of execution of an overall simulation of the radio wave environment of area ARE1 when moving body MV1 has traveled 1 m from location P1, i.e., initial placement location along movement route RUT1 (see FIG. 4A) is shown. Near transmission point TX1, the reception intensity (field intensity) of the radio wave is high. At reference point RCV1, in contrast, the reception intensity (field intensity) is relatively low not only because of reference point RCV1 being distant from transmission point TX1 but also because of reference point RCV1 being exposed to the influences of radio wave scattering by structures C1, C2 and moving body MV1.

At time T=t2, a result of execution of an overall simulation of the radio wave environment of area ARE1 when moving body MV1 has traveled 6 m from location P1, i.e., initial placement location along movement route RUT1 (see FIG. 4A) is shown. At time T=t2, similarly, the reception intensity (field intensity) of the radio wave is high near transmission point TX1, while the reception intensity (field intensity) is relatively low at reference point RCV1 not only because of reference point RCV1 being distant from transmission point TX1 but also because of reference point RCV1 being exposed to the influences of radio wave scattering by structures C1, C2 and moving body MV1.

At time T=t3, a result of execution of an overall simulation of the radio wave environment of area ARE1 when moving body MV1 has traveled 9 m from location P1, i.e., initial placement location along movement route RUT1 (see FIG. 4A) is shown. At time T=t3, similarly, the reception intensity (field intensity) of the radio wave is high near transmission point TX1, while the reception intensity (field intensity) is relatively low at reference point RCV1 not only because of reference point RCV1 being distant from transmission point TX1 but also because of reference point RCV1 being exposed to the influences of radio wave scattering by structures C1, C2 and moving body MV1.

At time T=t4, a result of execution of an overall simulation of the radio wave environment of area ARE1 when moving body MV1 has traveled 15 m from location P1, i.e., initial placement location along movement route RUT1 (see FIG. 4A) is shown. At time T=t4, similarly, the reception intensity (field intensity) of the radio wave is high near transmission point TX1, while the reception intensity (field intensity) is relatively low at reference point RCV1 not only because of reference point RCV1 being distant from transmission point TX1 but also because of reference point RCV1 being exposed to the influences of radio wave scattering by structures C1, C2 and moving body MV1.

Through the above simulations, radio wave environment analyzer 100 according to the first exemplary embodiment holds location information on the radio transmitter, which is disposed in area ARE1 where moving body MV1 is present, and location information on reference point RCV1, at which a radio wave from the radio transmitter is received, in the HDD 7. Radio wave environment analyzer 100 calculates a reception intensity of a radio wave at reference point RCV1 when moving body MV1 is present at the initial position, and calculates also a reception intensity of a radio wave at reference point RCV1 at each of points of time at which moving body MV1 has traveled a given distance (e.g., 1 m) from the initial location a plurality of times. Based on the reception intensity of the radio wave at reference point RCV1 for each location of moving body MV1, radio wave environment analyzer 100 selects a location (movement point) of moving body MV1 for executing the simulation of the radio wave environment of area ARE1.

Hence, in an actual environment of area ARE1, such as a factory, in which moving body MV1 is present, radio wave environment analyzer 100 uses a field intensity at reference point RCV1 when moving body MV1 is present at each location in movement route RUT1 through which moving body MV1 is expected to move, thereby being able to efficiently narrow down all moving points at which moving body MV1 could be present, to some movement points effective for calculation for the overall simulation of the radio wave environment. Radio wave environment analyzer 100 is thus able to suppress an increase in the number of calculations for performing the overall simulation of the radio wave environment, and is therefore able to quickly execute an analysis process of the overall simulation of the radio wave environment.

In addition, radio wave environment analyzer 100 executes the overall simulation of the radio wave environment, using a condition that moving body MV1 is present at each of one or more selected locations. Radio wave environment analyzer 100 is thus able to execute the overall simulation of the radio wave environment while taking into consideration the influences of radio wave scattering by moving body MV1 present in area ARE1, and is able to obtain a reception intensity of a radio wave at reference point RCV1 with high accuracy.

Furthermore, radio wave environment analyzer 100 causes display 6 to continuously display results of execution of the overall simulation of the radio wave environment of area ARE1 for respective locations of moving body MV1. This allows an observer of the radio wave environment to comprehensively grasp radio wave reception intensities in area ARE1 as a whole, which includes a radio wave reception intensity at reference point RCV1 while confirming reception intensity differences resulting from respective locations of moving body MV1 during the course of movement of moving body MV1.

In addition, radio wave environment analyzer 100 selects a location of moving body MV1 for executing the overall simulation according to comparison of a reception intensity difference with the threshold, the reception intensity difference being a difference between a reception intensity of a radio wave at reference point RCV1 when moving body MV1 is present at a location right before its movement and a reception intensity of a radio wave at reference point RCV1 when moving body MV1 is present at a location right after its movement. As a result, when the field intensity of the radio wave at reference point RCV1 changes by a value smaller than the threshold when moving body MV1 travels given distance by given distance (e.g., 1 m by 1 m), the location of moving body MV1 at the time of obtaining the post-movement field intensity is omitted from the simulation so that load on radio wave environment analyzer 100 upon executing the overall simulation is reduced.

Radio wave environment analyzer 100 obtains the reception intensity of the radio wave at reference point RCV1 by simulation (calculation). Radio wave environment analyzer 100 is thus able to easily obtain the reception intensity of the radio wave at reference point RCV1 by a simulation (calculation) based on execution of a simulation program, without actually measuring the reception intensity of the radio wave at reference point RCV1. By its calculations, therefore, radio wave environment analyzer 100 can efficiently carry out the entire series of processes ranging from executing the overall simulation of the radio wave environment of area ARE1 as a whole to displaying a result of the simulation.

Radio wave environment analyzer 100 obtains the reception intensity of the radio wave at reference point RCV1 also by actual measurement. Radio wave environment analyzer 100 is thus able to obtain the reception intensity (i.e., field intensity) of the radio wave at reference point RCV1 accurately through measurement by measuring instrument 11 and radio wave measurement device 12, and is therefore able to obtain a highly accurate result of execution of the overall simulation of the radio wave environment of area ARE1 as a whole.

Second Exemplary Embodiment

The first exemplary embodiment has been described as an assumed case where moving body MV1 present in area ARE1 is a single moving body. A second exemplary embodiment will be described as an assumed case where a plurality of moving bodies are present in area ARE2 (see FIG. 7). To make description understandable, the second exemplary embodiment will be described on the assumption that two moving bodies MV1, MV2 are present in area ARE2.

A radio wave environment analyzer according to the second exemplary embodiment is identical in configuration with the radio wave environment analyzer 100 according to the first exemplary embodiment, and therefore the same constituent elements will be denoted by the same reference marks to simplify or omit the description of such constituent elements and different contents will be described.

FIG. 7 shows an example of outline of operations of radio wave environment analyzer 100 according to the second exemplary embodiment. The second exemplary embodiment will be described with reference to area ARE2 which is an environment similar to area ARE1 according to the first exemplary embodiment (e.g., a closed space of a factory, an office, and the like) and in which transmission point TX1, structures C1, C2, and reference point RCV1 are arranged. In FIG. 7, structures C1, C2 are not illustrated. Each of moving bodies MV1, MV2 may be similar to moving body MV1 according to the first exemplary embodiment.

In the second exemplary embodiment, moving bodies MV1, MV2 move, for example, 100 times along their respective movement routes. This means that combinations of points reached by moving bodies MV1, MV2 after their movements amount to 10,000 (=100×100). Given this fact, if radio wave environment analyzer 100 performs an overall simulation of a radio wave environment in area ARE2 while taking account of respective movement patterns of moving bodies MV1, MV2 in area ARE2, it takes 10,000 times of calculations. In other words, load on radio wave environment analyzer 100 at the time of executing the overall simulation increases.

To deal with this problem, according to the second exemplary embodiment, when moving bodies MV1, MV2 each move in 100 movement patterns, radio wave environment analyzer 100 considers only one of a plurality of moving bodies to be in move while considering other one or more moving bodies to be still, and, in the same manner as in the first exemplary embodiment, narrows down movement points for executing the overall simulation, with regard to the moving body in move. Similarly, radio wave environment analyzer 100 considers one of the above-mentioned other one or more moving bodies to be in move while considering one or more moving bodies other than the moving body considered to be in move, to be still, and in the same manner as in the first exemplary embodiment, narrows down movement points for executing the overall simulation, with regard to the moving body in move.

This will be described with reference to FIG. 7 as follows. For example, radio wave environment analyzer 100 first considers only moving body MV1 to be in move while considering moving body MV2, i.e., the other moving body to be still, and, in the same manner as in the first exemplary embodiment, narrows down movement points for executing the overall simulation, out of 100 movement patterns of moving body MV1. It is assumed, for example, that the movement points have been narrowed down to 10 movement points (10 movement points have been selected), out of 100 moving patterns of moving body MV1 (see FIG. 8A). FIG. 8A is a graph showing an example of changes in a field intensity that result at reference point RCV1 shown in FIG. 7 in correspondence to travel distances of moving body MV1. The horizontal axis of the graph shown in FIG. 8A represents travel distances [m] of moving body MV1, and the vertical axis of the graph represents field intensities at reference point RCV1. It should be noted that FIG. 8A shows travel distances up to 15 m, which is part of a total movement distance of 100 m of moving body MV1.

As shown in FIG. 8A, radio wave environment analyzer 100 narrows down (determines) movement points for executing the overall simulation to locations Pt1a, Pt4a, Pt6a, Pt7a, Pt8a, Pt9a, Pt10a, Pt12a, Pt14a, Pt15a representing respective locations of moving body MV1. In the present exemplary embodiment, for simpler description, a case of selecting 10 points in the travel distance of 15 m of moving body MV1 is shown, but 10 points may be selected in a travel distance of 100 m. Specifically, radio wave environment analyzer 100 selects movement points (e.g., 10 points) for executing the overall simulation, out of a total of 100 points included in a given movement route along which moving body MV1 moves from location P11, i.e., initial placement location to location P12, i.e., movement end location, that is, narrows down those 100 points to the movement points (e.g., 10 points).

Figure 8B:
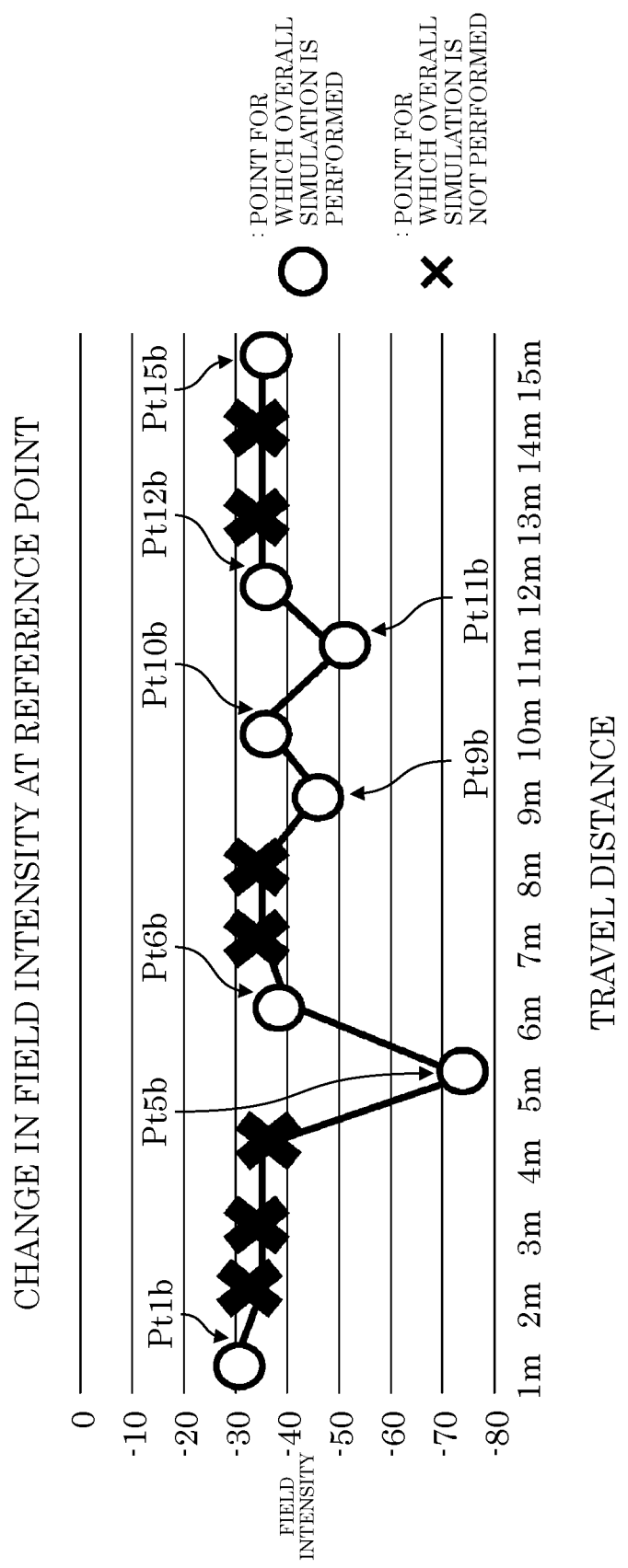
FIG. 8B is a graph showing an example of changes in a field intensity that result at the reference point shown in FIG. 7 in correspondence to travel distances of moving body MV2.

Next, radio wave environment analyzer 100 then considers only moving body MV2 to be in move while considering moving body MV1, i.e., the other moving body to be still, and, in the same manner as in the first exemplary embodiment, narrows down movement points for executing the overall simulation, out of 100 movement patterns of moving body MV2. It is assumed, for example, that the movement points have been narrowed down to 8 moving points (8 movement points have been selected), out of 100 moving patterns of moving body MV2 (see FIG. 8B). FIG. 8B is a graph showing an example of changes in a field intensity that result at reference point RCV1 shown in FIG. 7 in correspondence to travel distances of moving body MV2. The horizontal axis of the graph shown in FIG. 8B represents travel distances [m] of moving body MV2, and the vertical axis of the graph represents field intensities at reference point RCV1. It should be noted that FIG. 8B shows travel distances up to 15 m, which is part of a total travel distance of 100 m of moving body MV2.

As shown in FIG. 8B, radio wave environment analyzer 100 narrows down (determines) movement points for executing the overall simulation to locations Pt1b, Pt5b, Pt6b, Pt9b, Pt10b, Pt11b, Pt12b, Pt15b representing respective locations of moving body MV2. In the present exemplary embodiment, for simpler description, a case of selecting 8 points in the travel distance of 15 m of moving body MV2 is shown, but 8 points may be selected in a travel distance of 100 m. Specifically, radio wave environment analyzer 100 selects movement points (e.g., 8 points) for executing the overall simulation, out of a total of 100 points included in a given movement route along which moving body MV2 moves from location P21, i.e., initial placement location to location P22, i.e., movement end location, that is, narrows down those 100 points to the movement points (e.g., 8 points).

In the second exemplary embodiment, therefore, radio wave environment analyzer 100 calculates the product of the number of movement points (10), the movement points being selected in the assumed case where only moving body MV1 moves, and the number of moving points (8), the movement points being selected in the assumed case where only moving body MV2 moves, that is, calculates the product (80) as the number of moving points for executing the overall simulation. In other words, radio wave environment analyzer 100 does not need to execute the above-mentioned 10,000 times of overall simulations, and only needs to execute 80 times of overall simulations for the total of 80 movement points at which movement of the moving body thereto makes the reception intensity of the radio wave at reference point RCV1 apt to fluctuate. Hence an increase in the number of times of overall simulations can be further suppressed.

(Operations of Radio Wave Environment Analyzer)

Operations of radio wave environment analyzer 100 according to the second exemplary embodiment will then be described with reference to FIG. 9. FIG. 9 is a flowchart showing an example of an operation procedure of radio wave environment analyzer 100. Each of operation processes (steps) shown in FIG. 5 is executed in principle by processor 1 of radio wave environment analyzer 100. In the description of FIG. 9, the same step numbers are assigned to the processes that overlap with processes shown in FIG. 5 to simplify or omit description of such processes, and different contents will be described.

In FIG. 9, when a plurality of moving bodies MV1, MV2 are present at their respective initial placement locations P11, P21 in area ARE2, radio wave environment analyzer 100 carries out a calculation of a field intensity of a radio wave at reference point RCV1, the radio wave being transmitted from transmission point TX1 (St11). Subsequently, radio wave environment analyzer 100 considers only one of the plurality of moving bodies (e.g., moving body MV1) to be in move in area ARE2 while considering other one or more moving bodies (e.g., moving body MV2) to be still, and similarly carries out a calculation of the field intensity of the radio wave at reference point RCV1 when moving body MV1, which is in move, has traveled a given distance (e.g., 1 m) from location P11, i.e., initial placement location along a given movement route (St12).

It is assumed that the field intensity of the radio wave at reference point RCV1 when moving bodies MV1, MV2, which are all in move, have moved along their respective movement routes and reached their final points is not calculated (St13, NO). In this case, radio wave environment analyzer 100 repeatedly carries out calculations of the field intensity at reference point RCV1 when only one of the moving bodies is in move, until the field intensity of the radio wave at reference point RCV1 when moving bodies MV1, MV2, which are all in move, have moved along their respective movement routes and reached their final points is calculated (St12). For example, following the calculation of the field intensity of the radio wave at reference point RCV1 when moving body MV1 in move has moved along its movement route and reached its final point, radio wave environment analyzer 100 considers another moving body (e.g., moving body MV2) to be in move while considering one or more other moving bodies (e.g., moving body MV1) to be still, and similarly carries out a calculation of the field intensity of the radio wave at reference point RCV1 when moving body MV2, which is in move, has traveled a given distance (e.g., 1 m) from location P21, i.e., initial placement location along a given movement route (St12).

When the field intensity of the radio wave at reference point RCV1 when moving bodies MV1, MV2, which are all in move, have moved along their respective movement routes and reached their final points has been calculated (St13, YES), radio wave environment analyzer 100 compares the field intensity at reference point RCV1 before one round of movement of moving body MV1, which is the only moving body in move, with the field intensity at reference point RCV1 after one round of movement of moving body MV1, for each location of moving body MV1 (St14). In the same manner as in the first exemplary embodiment, radio wave environment analyzer 100 determines a location of moving body MV1 when a difference between the pre-movement field intensity and the post-movement field intensity is equal to or larger than the preset threshold, to be a movement point of moving body MV1 for which the overall simulation of the radio wave environment of area ARE2 is performed (St14, see FIG. 8A).

Similarly, radio wave environment analyzer 100 compares the field intensity at reference point RCV1 before one round of movement of moving body MV2, which is the only moving body in move, with the field intensity at reference point RCV1 after one round of movement of moving body MV2, for each location of moving body MV2 (St14). In the same manner as in the first exemplary embodiment, radio wave environment analyzer 100 determines a location of moving body MV2 when a difference between the pre-movement field intensity and the post-movement field intensity is equal to or larger than the preset threshold, to be a movement point of moving body MV2 for which the overall simulation of the radio wave environment of area ARE2 is performed (St14, see FIG. 8B).

Radio wave environment analyzer 100 calculates the product of the number of movement points selected in the assumed case of only moving body MV1 moving and the number of moving points selected in the assumed case of only moving body MV2 moving, as the number of moving points for executing the overall simulation (St14), and then proceeds to step St5. Processes at step St5 and subsequent steps in FIG. 9 are the same as processes at step St5 and subsequent steps in FIG. 5 referenced in the first exemplary embodiment, and are therefore omitted in further description.

As described above, when a plurality of moving bodies are present in area ARE2, radio wave environment analyzer 100 according to the second exemplary embodiment obtains radio wave reception intensities at reference point RCV1 respectively for given number of times of movement of a first moving body (e.g., moving body MV1) among the plurality of moving bodies MV1, MV2. Radio wave environment analyzer 100 obtains also radio wave reception intensities at reference point RCV1 respectively for a given number of times of movement of a second moving body (e.g., moving body MV2) among the plurality of moving bodies MV1, MV2. Based on each radio wave reception intensity at reference point RCV1 as described above, radio wave environment analyzer 100 selects respective locations of the plurality of moving bodies MV1, MV2 for executing the simulation of the radio wave environment of the area ARE2.

As a result, radio wave environment analyzer 100 does not need to execute the overall simulation the number of times (e.g., 10,000 times) equal to the number of movement patterns in the case of the plurality of moving bodies MV1, MV2 each moving, and only need to execute the overall simulation 80 times for a total of 80 moving points at which movement of the moving body thereto makes the radio wave reception intensity at reference point RCV1 apt to fluctuate. Hence an increase in the number of times of overall simulations can be further suppressed.

Various exemplary embodiments have been described above with reference to drawings. The present disclosure, needless to say, is not limited to these exemplary embodiments. Obviously, those who are skilled in the art can conceive various changes, modifications, substitutions, additions, deletions, and equivalents within the scope of what is described in the claims, and it is understood that they too rightfully belong to the technical scope of the present disclosure. In addition, constituent elements in various exemplary embodiments described above may be combined arbitrarily, providing that such combinations do not deviate from the substance of the invention.

The present disclosure is useful as a radio wave environment analyzer and a radio wave environment analyzing method that suppress an increase in the number of times of calculations in an overall simulation of a radio wave environment, the simulation being performed on a target area in which a moving body is present in an actual environment, and that efficiently execute an analysis process of the overall simulation of the radio wave environment.

What is claimed is:

1. A radio wave environment analyzer comprising:
a memory that holds location information on a radio transmitter disposed in a target area where at least one moving body is present and location information on a reference point at which a radio wave from the radio transmitter is received; and
a processor that obtains (i) a first reception intensity of the radio wave at the reference point when the at least one moving body is present at an initial location, and (ii) a plurality of second reception intensities of the radio wave at the reference point respectively corresponding to cases where the at least one moving body is present at a plurality of movement locations, the at least one moving body moving a plurality of times by a given distance from the initial location to travel to the plurality of movement locations,
wherein the processor selects one or more locations out of the plurality of movement locations to execute a simulation of a radio wave environment in the target area, based on the first reception intensity and the plurality of second reception intensities,
the at least one moving body is one first moving body, and
the processor selects the one or more locations of the one first moving body to execute the simulation, in accordance with comparison of a reception intensity difference with a threshold, the reception intensity difference being a difference between a pre-movement reception intensity of the radio wave at the reference point when the one first moving body is present at a location right before movement of the one first moving body and a post-movement reception intensity of the radio wave at the reference point when the one first moving body is present at a location right after movement of the first moving body, the pre-movement reception intensity being the first reception intensity or one of the plurality of second reception intensities, the post-movement reception intensity being one of the plurality of second reception intensities.

2. The radio wave environment analyzer according to claim 1, wherein
the processor executes the simulation, using a condition that the at least one moving body is present at each of the one or more locations selected.

3. The radio wave environment analyzer according to claim 2, wherein
the processor causes a display to continuously display results of execution of the simulation for respective locations of the at least one moving body.

4. The radio wave environment analyzer according to claim 1, wherein
the at least one moving body is a plurality of moving bodies including a first moving body and a second moving body, and
the processor selects the one or more locations of each of the plurality of moving bodies to execute the simulation of a radio wave environment in the target area, based on the first reception intensity corresponding to each of the plurality of moving bodies and the plurality of second reception intensities corresponding to each of the plurality of moving bodies.

5. The radio wave environment analyzer according to claim 1, wherein
the processor obtains the first reception intensity and the plurality of second reception intensities of the radio wave at the reference point by simulation.

6. The radio wave environment analyzer according to claim 1, wherein
the processor obtains the first reception intensity and the plurality of second reception intensities of the radio wave at the reference point by actual measurement.

7. A radio wave environment analyzing method comprising the steps of;
holding location information on a radio transmitter disposed in a target area where a moving body is present and location information on a reference point at which a radio wave from the radio transmitter is received;
obtaining (i) a first reception intensity of the radio wave at the reference point when the moving body is present at an initial location and (ii) a plurality of second reception intensities of the radio wave at the reference point respectively corresponding to cases where the moving body is present at a plurality of movement locations, the moving body moving a plurality of times by a given distance from the initial location to travel to the plurality of movement locations; and
selecting one or more locations out of the plurality of movement locations of the moving body to execute a simulation of a radio wave environment in the target area, based on the first reception intensity and the plurality of second reception intensities,
wherein the at least one moving body is one first moving body, and
selecting the one or more locations of the one first moving body to execute the simulation, in accordance with comparison of a reception intensity difference with a threshold, the reception intensity difference being a difference between a pre-movement reception intensity of the radio wave at the reference point when the one first moving body is present at a location right before movement of the one first moving body and a post-movement reception intensity of the radio wave at the reference point when the one first moving body is present at a location right after movement of the first moving body, the pre-movement reception intensity being the first reception intensity or one of the plurality of second reception intensities, the post-movement reception intensity being one of the plurality of second reception intensities.

* * * * *